United States Patent
Murakami et al.

[11] Patent Number: 5,958,828
[45] Date of Patent: Sep. 28, 1999

[54] CATALYST FOR PURIFYING EXHAUST GAS

[75] Inventors: Hiroshi Murakami, Hiroshima; Hiroshi Yamada, Hatsukaichi; Kenji Okamoto, Hiroshima; Kaori Imada, Hiroshima; Yuki Koda, Hiroshima; Osamu Takayama, Hiroshima; Shinichi Tanioka, Hiroshima, all of Japan

[73] Assignee: Mazda Motor Corporation, Japan

[21] Appl. No.: 08/605,444

[22] Filed: Feb. 26, 1996

[30] Foreign Application Priority Data

Feb. 24, 1995 [JP] Japan .................................. 7-036643

[51] Int. Cl.⁶ .............................. B01J 23/44; B01J 23/02; B01J 23/10

[52] U.S. Cl. ........................... 502/333; 502/304; 502/341; 502/349

[58] Field of Search ..................... 502/333, 304, 502/341, 349

[56] References Cited

U.S. PATENT DOCUMENTS 5,260,249  11/1993  Shiraishi et al. ..................... 502/304
5,597,771   1/1997  Hu et al. .............................. 502/304

FOREIGN PATENT DOCUMENTS 2-214540  8/1990  Japan .

*Primary Examiner*—Michael Lewis
*Assistant Examiner*—Alexander G. Ghyka
*Attorney, Agent, or Firm*—Morrison & Foerster

[57] ABSTRACT

An exhaust gas purifying catalyst (3) has an inner catalytic layer (5) fixed on a carrier (4). In the inner catalytic layer (5), there are held a palladium component, platinum component and a rhodium component by a base material containing an alumina component composed of alumina impregnated with lanthanum. Further, the exhaust gas purifying catalyst (3) has an outer catalytic layer (6) formed on the inner catalytic layer (5). In the outer catalytic layer (6), a palladium component is held by a base material which contains an alumina component, an oxide complex of ceria and zirconia and a magnesium component.

9 Claims, 3 Drawing Sheets

CATALYST FOR PURIFYING EXHAUST GAS

FIELD OF THE INVENTION

The present invention relates to a catalyst for purifying an exhaust gas of an automobile engine or the like.

DESCRIPTION OF THE PRIOR ART

In general, in an exhaust system of an automobile engine or the like, there is provided an exhaust gas purifying apparatus using a catalyst for purifying an exhaust gas (an exhaust gas purifying catalyst), since there are contained various air pollutants such as HC (hydrocarbons), CO (carbon monoxide), NOx (nitrogen oxides) and the like in the exhaust gas. Thus, as one of the above-mentioned exhaust gas purifying catalysts, conventionally, there is widely used such a catalyst as to have a catalytic layer in which a catalytic precious metal such as platinum, rhodium or the like is held (supported) by a base material composed of alumina or the like, the catalytic layer being fixed on a surface of a monolith-shaped carrier composed of cordierite or the like.

However, in the above-mentioned conventional exhaust gas purifying catalyst using a catalytic precious metal such as platinum, rhodium or the like, there is such a disadvantage that the catalytic activity of the catalyst is relatively weak when the temperature of the catalyst is lower. In consequence, there is such a problem that when the temperature of the exhaust gas is lower, for example, in a very early time after the engine has begun to work, the temperature of the exhaust gas purifying catalyst is not sufficiently raised so that the emission efficiency of the engine grows worse. On the other hand, recently, in the emission regulation (particularly, in the emission regulation of the U.S.A.), it is required to improve the purification efficiency of air pollutants (particularly, HC) in the very early time after the engine has begun to work. Therefore, an exhaust gas purifying catalyst having a high catalytic activity in a lower temperature condition is required.

By the way, palladium is conventionally well known as a catalytic metal having a high catalytic activity when the exhaust gas temperature is lower. Thus, in the Japanese patent laid-open publication No. 2-214540, there is proposed an exhaust gas purifying catalyst having a high catalytic activity at a lower temperature condition, wherein an inner (lower) catalytic layer in which a platinum component and a rhodium component are held (supported) by a base material composed of alumina, is formed on a surface of a honeycomb-shaped carrier, and further an outer (upper) catalytic layer in which a palladium component is held by a base material, is formed on the inner catalytic layer.

However, in the conventional exhaust gas purifying catalyst containing the palladium component as a catalytic metal, there is such a problem that although the catalytic activity in a lower temperature condition is raised, the exhaust gas purifying catalyst is deteriorated in a relatively early period after the catalyst has begun to be used, for example, at the time that the automobile using the above-mentioned catalyst has run about 3000 to 4000 km.

Hereupon, it would be considered that the early deterioration of the catalyst as described above is caused due to such an origin that HC in the exhaust gas which has a relatively high molecular weight and thus has a strong adsorptive property is adsorbed by the palladium component in the catalyst so that the catalytic activity of the palladium component is lowered. Further, it would be considered that the palladium component in the catalyst is poisoned by $H_2S$ (hydrogen sulfide), $SO_2$ (sulfur dioxide), leaden compounds and/or the like so that the catalytic activity of the catalyst is lowered.

SUMMARY OF THE INVENTION

The present invention has been developed to solve the above-mentioned conventional problems, and has an object of providing a catalyst for purifying an exhaust gas having a high catalytic ability at a lower temperature condition, in which an early deterioration thereof is not caused.

Thus, according to an aspect of the present invention which is developed to achieve the above-mentioned object, there is provided a catalyst for purifying an exhaust gas (an exhaust gas purifying catalyst) including a catalytic layer in which a palladium component is held (supported) by a base material, the catalytic layer being formed on a carrier, wherein the base material contains an alumina component, an oxide complex of ceria and zirconia and a magnesium component, the catalytic layer having a surface which contacts with the exhaust gas. Although the oxide complex of ceria and zirconia is preferably used in the above-mentioned catalyst, a ceria component or a zirconia component, or the both of them may be used instead of the oxide complex.

According to the above-mentioned exhaust gas purifying catalyst, since the palladium component which has a high catalytic activity at a lower temperature condition is used as a catalytic component, the catalytic activity of the catalyst at the lower temperature condition is raised. Further, since the ceria component in the oxide complex has such an operation so as to raise the purification efficiency of the palladium component, the exhaust gas purifying efficiency of the catalyst is further improved. Still more, since the zirconia component in the oxide complex raises the heat resisting property of the ceria component and the palladium component, the durability of the exhaust gas purifying catalyst is improved. Moreover, since the magnesium component captures or adsorbs HC in the exhaust gas, it is restrained that HC in the exhaust gas is adsorbed by the palladium component. Therefore, the deterioration of the catalytic activity of the catalyst is restrained so that the early deterioration of the exhaust gas purifying catalyst is prevented.

In the above-mentioned exhaust gas purifying catalyst, it is preferable that the magnesium component is composed of magnesium oxide.

Further, in each of the above-mentioned exhaust gas purifying catalyst, it is preferable that each of the palladium component, the oxide complex of ceria and zirconia and the magnesium component is held by the alumina component. Hereupon, it is more preferable that the alumina component is composed of alumina impregnated with lanthanum. Alumina impregnated with lanthanum, namely a porous alumina material in which lanthanum is fixed on the surface thereof, particularly elevates the heat resisting property of the catalytic layer.

Moreover, in each of the above-mentioned exhaust gas purifying catalyst, it is preferable that a second catalytic layer in which a catalytic precious metal is held by a base material containing an alumina component, is formed between the carrier and the catalytic layer, the second catalytic layer being fixed to the carrier. In this case, the purification efficiency of the catalyst in an ordinary condition, namely in a higher temperature condition is improved so that the emission performance of the automobile engine using the catalyst is improved.

Hereupon, it is more preferable that the catalytic precious metal comprises a palladium component, a platinum component and a rhodium component. In this case, the purification efficiency of the catalyst in the ordinary condition and the lower temperature condition is improved so that the emission performance of the automobile engine using the catalyst is further improved.

In addition, in each of the above-mentioned exhaust gas purifying catalyst, it is preferable that a magnesium content relative to a quantity of the catalytic layer is from 5 to 20 percent by weight, more preferably about 10 percent by weight.

BRIEF DESCRIPTION OF THE DRAWINGS

These and other objects, features and advantages of the present invention will become clear from the following description taken in conjunction with the preferred embodiment with reference to the accompanying drawings, and in which.

DETAILED DESCRIPTION OF THE PREFERRED EMBODIMENT

Hereinafter, a preferred embodiment of the present invention will be concretely described with reference to the accompanying drawings.

Figure 2:
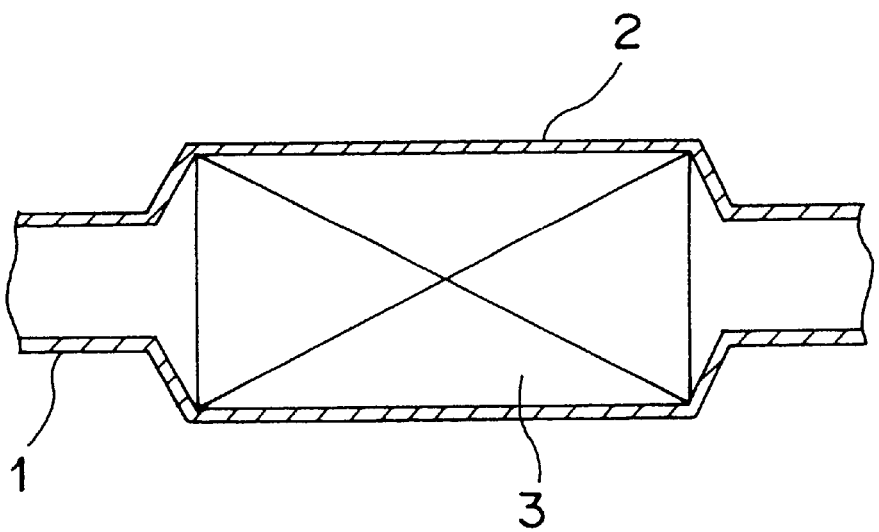
FIG. 2 is a longitudinal sectional view of an exhaust gas purifying apparatus using the exhaust gas purifying catalyst shown in FIG. 1.

As shown in FIG. 2, in an exhaust pipe 1 for discharging an exhaust gas of an automobile engine (not shown), there is interposed an exhaust gas purifying apparatus 2 (a catalytic converter), in which a catalyst 3 for purifying air pollutants contained in the exhaust gas, such as HC, CO, NOx and the like, is packed.

Figure 1:
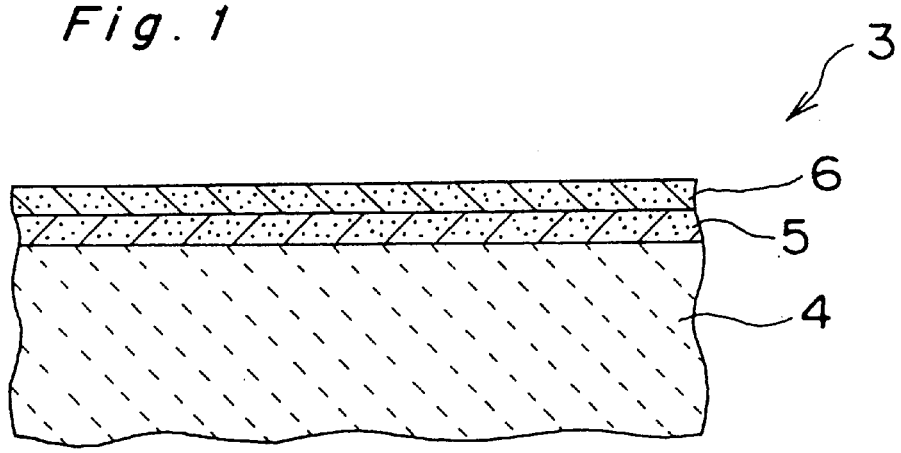
FIG. 1 is a longitudinal sectional view of an exhaust gas purifying catalyst according to the present invention.

As shown in FIG. 1, in the catalyst 3 for purifying the exhaust gas (exhaust gas purifying catalyst), an inner (lower) catalytic layer 5 is formed (fixed) on a honeycomb-shaped carrier 4 composed of cordierite which is a carrier material with a good heat resisting property. Further, on the inner catalytic layer 5, an outer (upper) catalytic layer 6 (the second catalytic layer) is formed. Although the carrier 4 is composed of cordierite in the catalyst 3 described above, it goes without saying that the material of the carrier 4 is not restricted to cordierite.

The inner catalytic layer 5 has such a fundamental construction that a catalytic precious metal is held (supported) by a base material therein. Hereupon, the catalytic precious metal contains a platinum (Pt) component, a rhodium (Rh) component and a palladium component, while the base material contains an alumina ($\gamma$-alumina) component composed of alumina impregnated with lanthanum. Alumina impregnated with lanthanum, namely a porous alumina material in which a lanthanum component is fixed (adhered) on the surface thereof, particularly improves the heat resisting property of the inner catalytic layer 5. Further, the inner catalytic layer 5 contains an oxide complex composed of ceria (cerium oxide) and zirconia (zirconium oxide), which functions as a promoter (OSC) for improving the exhaust gas purification ability or heat resisting property of the catalytic precious metal, an alumina boehmite component which functions as a binder for improving the mutual combining property among the components contained in the inner catalytic layer 5, and a lanthanum component which is an additive agent for restraining the sintering of the aluminum component etc.. Here at, zirconia in the inner catalytic layer 5 also has such a function as to improve the heat resisting property of the ceria component. Although the oxide complex of ceria and zirconia is preferably used in the above-mentioned exhaust example, a ceria component or a zirconia component, or the both of them may be used instead of the oxide complex.

Hereupon, the alumina component contained in the base material may be composed of alumina impregnated with lanthanum and zirconium instead of alumina impregnated with lanthanum. In this case, the heat resisting property of the inner catalytic layer 5 is further improved.

The outer catalytic layer 6 has such a fundamental construction that a palladium component is held by a base material therein, the base material containing alumina impregnated with lanthanum. Further, the outer catalytic layer 6 contains an oxide complex composed of ceria and zirconia which functions as a promoter for improving the exhaust gas purification ability or heat resisting property of the palladium component, an alumina boehmite component which functions as a binder for improving the mutual combining property among the components contained in the outer catalytic layer 6, and a magnesium component which functions as a additive agent for preventing (restraining) HC in the exhaust gas from being adsorbed onto the palladium component. Hereupon, the zirconia component in the outer catalytic layer 6 also has such a function as to improve the heat resisting property of the ceria component.

Hereupon, the alumina component contained in the base material may be composed of alumina impregnated with lanthanum and zirconium instead of alumina impregnated with lanthanum. In this case, the heat resisting property of the outer catalytic layer 6 is further improved.

Hereinafter, a manufacturing method of an exhaust gas purifying catalyst 3 according to the present invention will be described.

(1) At first, an oxide complex powder composed of ceria and zirconia (its average particle diameter~(nearly equal) 4 $\mu$m, Ce/Zr ratio=5/1) and an alumina powder impregnated with lanthanum (or an alumina powder impregnated with lanthanum and zirconium) are mixed together at the ratio of 1/9 respectively so as to form a first mixture. Then, the first mixture is mixed with a proper quantity of alumina boehmite (binder) and water so as to form a first slurry, and then the first slurry is applied onto a carrier 4 by means of a conventional wash-coating technique so that a first coating layer is formed on the carrier 4.

(2) The first coating layer formed on the carrier 4 is induced to hold (support) a catalytic precious metal containing platinum, palladium and rhodium (Pt/Pd/Rh=1/20/1) thereon, the catalytic precious metal content being adjusted to 6.7 percent by weight. Hereupon, the catalytic precious metal holding process is performed by means of a conventional impregnation treatment technique using a solution containing a catalytic precious metal component.

(3) The first coating layer on the carrier 4 is induced to hold a lanthanum component thereon by means of an impregnation treatment technique, the lanthanum content being adjusted to 9 percent by weight. Then, the first coating layer is subjected to a drying treatment so that an inner catalytic layer 5 is formed (fixed) on the carrier 4.

(4) An oxide complex powder composed of ceria and zirconia (its average particle diameter~4 $\mu$m, Ce/Zr ratio =5/1) is induced to hold a proper quantity of palladium component, and then the powder is mixed with a proper quantity of alumina powder impregnated with lanthanum so as to form a second mixture. Then, the second mixture is mixed with a proper quantity of alumina boehmite (binder) and water so as to form a second slurry, and then the second slurry is applied onto the inner catalytic layer 5 formed on the carrier 4 by means of a conventional wash-coating technique so that a second coating layer is formed on the inner catalytic layer 5.

(5) The second coating layer is impregnated with magnesium in such a manner that the magnesium content becomes as same as that of the oxide complex by weight therein. Then, the second coating layer is subjected to a drying treatment so that an outer catalytic layer 6 is formed on the inner layer 5. Thus, the exhaust gas purifying catalyst 3 is completed.

An experimental data of the composition of an exhaust gas purifying catalyst 3 produced using the manufacturing method described above is as follows. However, the data shown below is a mere example, in consequence, it goes without saying that the present invention is not restricted by the composition.

<Inner catalytic layer>
1. Catalytic precious metal
   Pd: 4.0 g/L Pt: 0.2 g/L Rh: 0.2 g/L
2. Promoter
   Oxide complex of ceria and zirconia: 6 g/L
3. Base material
   Alumina impregnated with La: 54 g/L
4. Additive agent
   La: 6 g/L
5. Binder
   Alumina boehmite: 6 g/L <Outer catalytic layer>
1. Catalytic precious metal
   Pd: 6 g/L
2. Promoter
   Oxide complex of ceria and zirconia: 60 g/L
3. Base material
   Alumina impregnated with La: 50 g/L
4. Additive agent
   Mg: 6 g/L
5. Binder
   Alumina boehmite: 12 g/L As described above, since the inner catalytic layer 5 of the exhaust gas purifying catalyst 3 contains the palladium component having a high catalytic activity at the lower temperature condition (region) as a catalytic precious metal in addition to the platinum component and the rhodium component, the catalytic activity of the catalyst 3 is raised at both of the ordinary condition (higher temperature condition) and the lower temperature condition. Further, since the inner catalytic layer 5 contains the ceria component which raises the catalytic activity of the catalytic precious metal, the exhaust gas purifying ability of the exhaust gas purifying catalyst 3 is further improved. Moreover, the inner catalytic layer 5 contains the zirconia component which raises the heat resisting property of the catalytic precious metal and the ceria component, the durability of the exhaust gas purifying catalyst 3 is improved.

In addition, since the outer catalytic layer 6 of the exhaust gas purifying catalyst 3 contains the palladium component as a catalytic precious metal, the exhaust gas purifying efficiency of the exhaust gas purifying catalytic 3 at the lower temperature condition is further improved. Further, since the outer catalytic layer 6 contains the ceria component and the zirconia component, the exhaust gas purifying ability and durability of the exhaust gas purifying catalyst 3 is much further improved.

Moreover, since the magnesium component, which is contained in the outer catalytic layer 6, captures or adsorbs HC in the exhaust gas, it is restrained that HC in the exhaust gas is adsorbed by the palladium component in the outer catalytic layer 6. Therefore, the deterioration of the catalytic activity of the palladium component is restrained so that the early deterioration of the exhaust gas purifying catalyst 3 is prevented. Also, since the durability of the palladium component against poisoning thereof under the circumstance of the actual exhaust gas is improved, whereby the deterioration of the catalytic activity of the palladium component is restrained so that the early deterioration of the exhaust gas purifying catalyst 3 is prevented.

Hereupon, the reason why the deterioration of the catalytic activity of the palladium component in the outer catalytic layer 6 is prevented or restrained by the magnesium component as described above would be considered as follows.

Namely, it will be considered that the deterioration of the palladium component under the circumstance of the exhaust gas which is actually discharged from the automobile engine is caused due to (1) strong adsorption property of HC in the exhaust gas and (2) occurrence of a sintering phenomenon caused by reduction of palladium oxide (PdO) generated in a early time. Hereupon, in such a case that the exhaust gas purifying catalyst 3 has a multi-layer construction in which a plurality of catalytic layers are provided therein, the outer the position of a certain catalytic layer is set, the more the catalytic layer has portions each of which becomes a target of poisoning as described above.

However, if there exists an additive agent containing a magnesium component (being in a form of magnesium oxide on the catalyst) close to the portion on which the palladium component (more exactly, holding site of the palladium component) is held, the magnesium component captures or adsorb HC so that the adsorption of HC against the palladium component is restrained or prevented. Thus, there is caused such a condition that each the active points of the palladium component lacks oxygen due to the adsorptive operation between HC species of multi-ring type (or HC of straight chain type) in the exhaust gas and the palladium component so that such a phenomenon that an original HC purifying reaction (combustion) is prevented can be restrained. Further, the occurrence of the sintering as described above is also restrained.

Therefore, it would be considered that the deterioration of the palladium component in the outer catalytic layer 6 is restrained or prevented when the magnesium component is added into the outer catalytic layer 6. Hereupon, since the magnesium component used for restraining the deterioration of the palladium component as described above, fundamentally, has also such an operation as to restrain the high oxidation activity of the palladium component, it does not always follow that it is desire to add so much magnesium thereto. However, it would be necessary that the weight of the magnesium component added to the outer catalytic layer 6 is more than or equal to the weight of the palladium component, and thus it would be considered that a preferable range of the magnesium content is from 5 to 20 percent relative to the quantity of the outer catalytic layer 6 by weight.

Figure 3:
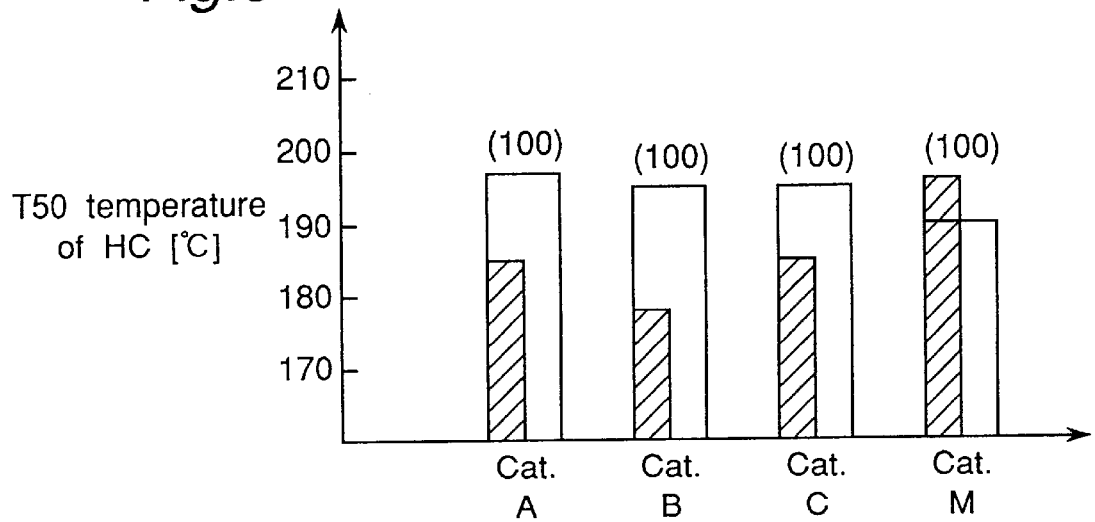
FIG. 3 is a histogram showing T50 temperature of HC as to an exhaust gas purifying catalyst according to the present invention as compared with those of conventional exhaust gas purifying catalysts.
Figure 4:
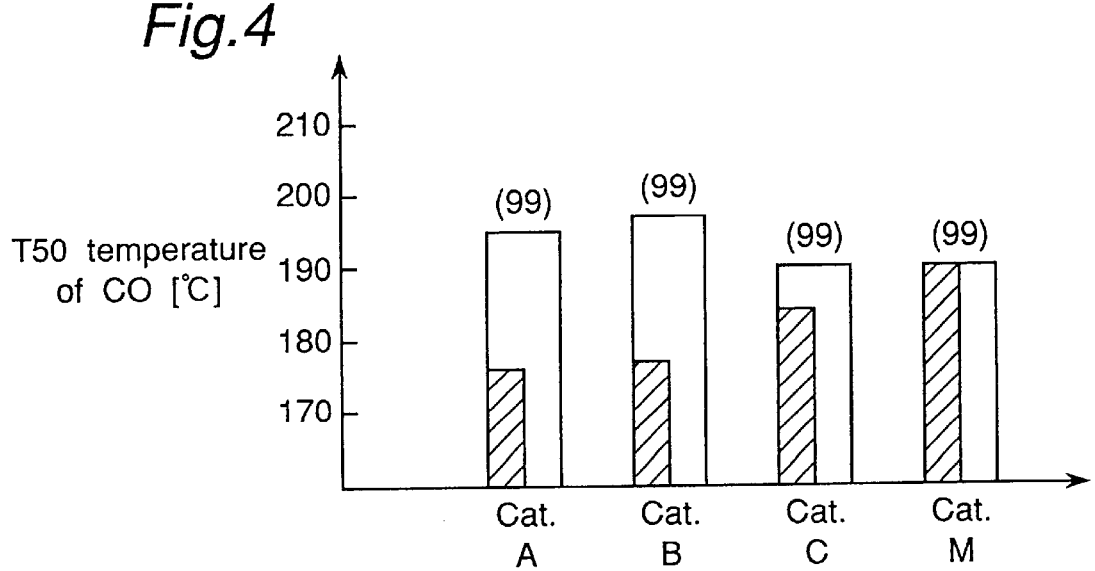
FIG. 4 is a histogram showing T50 temperature of CO as to the exhaust gas purifying catalyst according to the present invention as compared with those of the conventional exhaust gas purifying catalysts.
Figure 5:
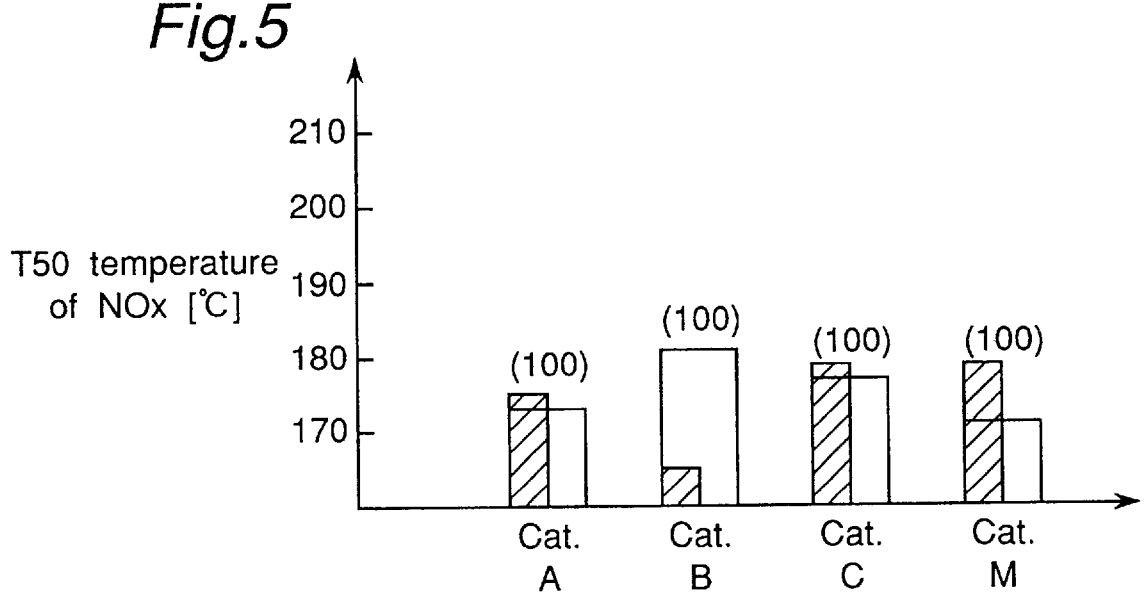
FIG. 5 is a histogram showing T50 temperature of NOx as to the exhaust gas purifying catalyst according to the present invention as compared with those of the conventional exhaust gas purifying catalysts.

In FIGS. 3 to 5, there are shown T50 temperature of HC, T50 temperature of CO and T50 temperature of NOx as to an exhaust gas purifying catalyst 3 according to the present invention in comparison with those of comparative examples respectively. In FIGS. 3 to 5, each of numerals written in parentheses means C400 purification ratio of the aged catalysts.

Hereupon, T50 temperature means such a temperature (°C.) of the inlet exhaust gas that the purifying ratio of HC, CO or NOx becomes 50 percent. On the other hand, C400 purification ratio (percent) means a purification ratio of HC, CO or NOx measured at such a condition that the temperature of the inlet exhaust gas is 400° C. Namely, T50 temperature is an index for evaluating the catalytic activity or exhaust gas purifying ability of the catalyst at the lower temperature condition. Therefore, the lower T50 temperature of the catalyst becomes, the higher the catalytic activity or exhaust gas purifying ability of the catalyst at the lower temperature condition becomes. On the other hand, C400 purification ratio is an index for evaluating the exhaust gas purifying ability of the exhaust gas purifying catalyst at the ordinary condition (higher temperature condition). Therefore, the higher C400 purification ratio of the exhaust gas purifying catalyst becomes, the higher the exhaust gas purifying ability of the catalyst at the ordinary condition becomes.

In FIGS. 3 to 5, the catalyst M is an exhaust gas purifying catalyst according to the present embodiment, while each of the catalysts A,B and C is a conventional exhaust gas purifying catalyst produced for comparison. Further, in FIGS. 3 to 5, blanc bar graphs indicate the data as to the aged catalysts, while hatched bar graphs indicate data as to the fresh catalysts. Hereupon, the aging treatment was performed in such a manner that each of the catalysts was exposed for 8 hours in a circumstance of an exhaust gas whose temperature was changed step by step within a range of 450 to 700° C., the exhaust gas being made from a gas mixture whose air-fuel ratio (A/F) was 14.7±0.9.

The characteristics of each of the catalysts A,B and C which is a comparative example, are nearly as follows. Hereupon, characteristics except those described below are, fundamentally, as same as those of the catalyst according to the present embodiment.

1. Catalyst A
   Inner catalytic layer
      Pd: 4 g/L Pt: 0.2 g/L Rh: 0.2 g/L
   Outer catalytic layer
      Pd: 6 g/L Additive agent: not exist
2. Catalyst B
   This is a catalyst in which La is added into the outer catalytic layer of the catalyst A, the La content being 10 wt % relative to the layer.
3. Catalyst C
   This is a catalyst in which Ba is added into the outer catalytic layer of the catalyst A, the Ba content being 10 wt % relative to the layer.

Hereupon, the catalyst M, which is an exhaust gas purifying catalyst according to the present embodiment, is a catalyst in which Mg is added into the outer catalytic layer of the catalyst A, the Mg content being 10 wt % relative to the layer.

As apparent from FIGS. 3 to 5, in the catalyst M which is an exhaust gas purifying catalyst according to the present embodiment, every one of T50 temperatures of HC, CO and NOx as to the aged one is lower than or equal to those of the fresh one. Thus, any deterioration is not seen in the catalyst M so that it would be considered that the early deterioration of the catalyst M is not caused. On the other hand, in the catalysts A,B and C each of which is a comparative example, every one of T50 temperatures of HC and CO as to the aged ones is higher than that of the fresh one. Thus, a deterioration is apparently seen in the catalysts A,B and C so that it would be considered that an early deterioration is caused in each of the catalysts A,B and C. Further, in the catalysts A and C, T50 temperature of NOx as to the aged one is a little lower than that of the fresh one. However, since each of T50 temperatures of HC and CO as to the aged ones is much higher as described above, it is apparent that the whole purification efficiency is deteriorated. In the catalyst B, the purification efficiency of NOx is highly deteriorated.

Moreover, as apparent from FIGS. 3 to 5, since every one of C400 purification ratios of HC, CO and NOx as to the catalyst M according to the present embodiment is 100% or nearly 100%, it is also apparent that the purification efficiency of the exhaust gas purifying catalyst according to the present embodiment at the ordinary condition is sufficiently improved.

Thus, according to the above-mentioned embodiment, the exhaust gas purifying catalyst which has a higher exhaust gas purification efficiency at both of the ordinary condition and the lower temperature condition, wherein the deterioration is not caused.

Although, the present invention has been described in terms of preferred embodiments, it will be apparent to those of skill in the art that numerous variations and modifications may be made without departing from the true spirit and scope thereof, as set forth in the following claims.

What is claimed is:

1. A catalyst for purifying exhaust gas comprising a first catalytic layer in which a palladium component is held in a base material, said first catalytic layer being formed as an outermost layer on a carrier, wherein said base material contains an alumina component, an oxide complex of ceria and zirconia and a magnesium component, said first catalytic layer having a surface which directly contacts with the exhaust gas, and a second catalytic layer in which a catalytic metal is held by a base material containing an alumina component, said second catalytic layer being formed between said carrier and said first catalytic layer, and said second catalytic layer being fixed to said carrier.

2. The catalyst for purifying the exhaust gas as recited in claim 1, wherein said magnesium component comprises magnesium oxide.

3. The catalyst for purifying the exhaust gas recited in claim 1, wherein each of said palladium component, said oxide complex of ceria and zirconia and said magnesium component is held by said alumina component.

4. The catalyst for purifying the exhaust gas recited in claim 3, wherein said alumina component comprises alumina impregnated with lanthanum.

5. The catalyst for purifying the exhaust gas recited in claim 1, wherein said catalytic metal comprises a palladium component, a platinum component and a rhodium component.

6. The catalyst for purifying the exhaust gas recited in claim 1, wherein a magnesium content relative to a quantity of said catalytic layer is from 5 to 20 percent by weight.

7. The catalyst for purifying the exhaust gas recited in claim 6, wherein the magnesium content relative to the quantity of said catalytic layer is about 10 percent by weight.

8. The catalyst for purifying the exhaust gas recited in claim 1, wherein said second catalytic layer contains a lanthanum component.

9. A catalyst for purifying an exhaust gas comprising:

an inner catalytic layer in which a catalytic metal is held by a base material containing an alumina component, said inner catalytic layer being fixed to a carrier; and an outer catalytic layer in which a palladium component is held by a base material, said outer catalytic layer being formed on said inner catalytic layer, said base material containing an alumina component, an oxide complex of ceria and zirconia and a magnesium component, said outer catalytic layer having a surface which contacts with the exhaust gas.

\* \* \* \* \*